Dec. 25, 1962 W. E. GLENN, JR 3,070,688

LIGHT SOURCE SYSTEM

Original Filed March 2, 1959 3 Sheets-Sheet 1

Inventor:
William E. Glenn Jr.,
by Richard R. Brainard
His Attorney.

Inventor:
William E. Glenn, Jr.,
by Richard R. Brainard
His Attorney.

Dec. 25, 1962 W. E. GLENN, JR 3,070,688

LIGHT SOURCE SYSTEM

Original Filed March 2, 1959 3 Sheets-Sheet 3

Inventor:
William E. Glenn Jr.,
by Richard R. Brainard
His Attorney.

United States Patent Office 3,070,688

Patented Dec. 25, 1962

3,070,688

LIGHT SOURCE SYSTEM

William E. Glenn, Jr., Scotia, N.Y., assignor to General Electric Company, a corporation of New York Original application Mar. 2, 1959, Ser. No. 796,450. Divided and this application Dec. 14, 1960, Ser. No. 81,913

8 Claims. (Cl. 240—41.35)

Figure 1:
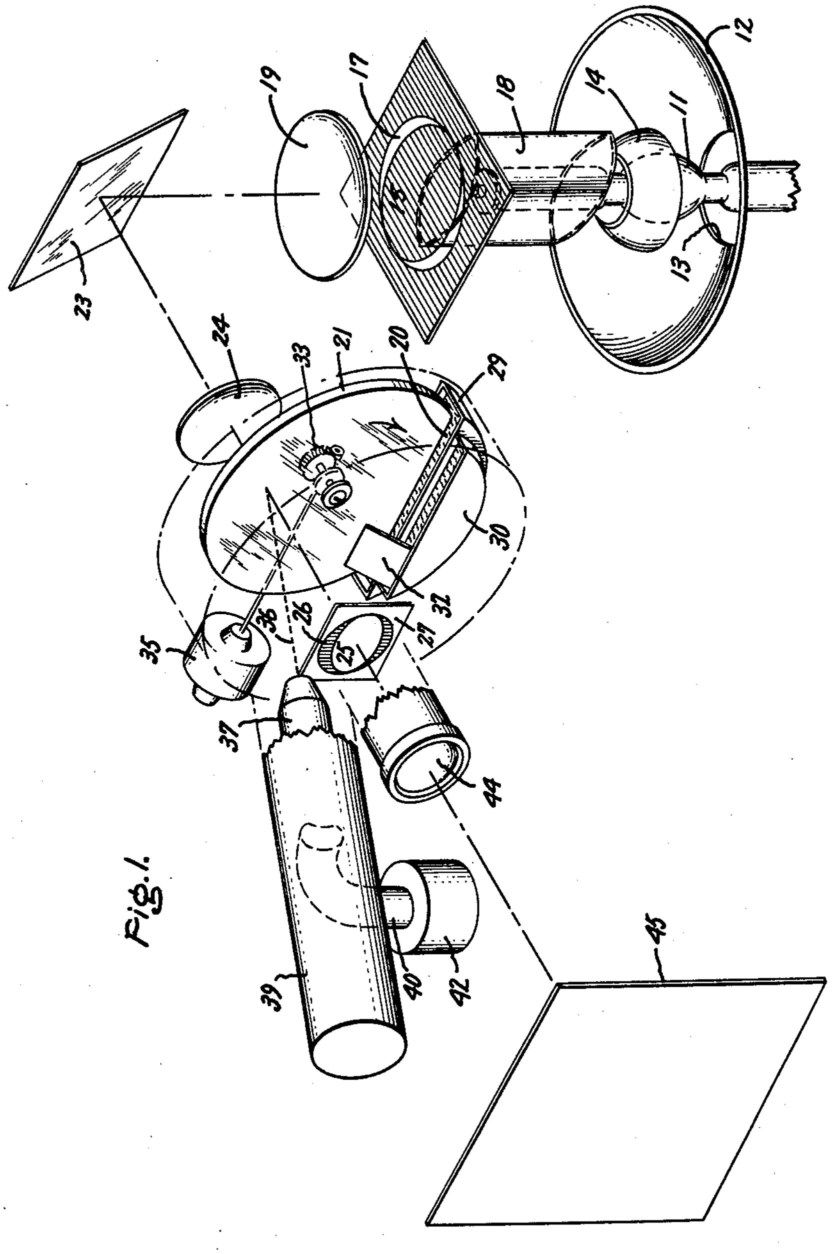

The present invention relates to a light source system having particular advantages as used for projecting light as a function of the parameters of a diffraction grating in a light modulating medium. This application is a division of my application Serial No. 796,450, filed March 2, 1959, entitled, "Projection System."

There are many applications in which it is desired to produce a viewable image that is a function of applied or received electrical signals. Since television is probably the most common application, the present discussion will be directed toward television applications although it is to be realized that it is applicable as well to any application in which it is desired to obtain light as a function of applied electrical signals. In most television receivers the light image is directly viewed from the source from which it is generated—the phosphor screen. Unfortunately, such an arrangement has limitations as regards size and light intensity and thus efforts have been directed in recent years towards producing projection systems. In one especially suitable projection system, a deformable light modulating medium is used. The applied television signals modulate an electron beam that is deflected over the surface of the deformable light modulating medium. On this medium, the electron beam produces closely spaced lines of electron charge, the charge densities of which are a function of the television signals, and which for monochrome television signals correspond point-by-point with the light intensity of the televised scene. These lines of charge, which are attracted to a conducting plane beneath the light modulating medium, produce corresponding lines of depression deformations, the depths of which depend upon the charge densities. The spacing of the lines of charge are made close enough that the resulting lines of deformations have spacings of the order of grating line spacings and in fact these deformations form a diffraction grating. A very bright light source having a narrow dimension in the direction of the diffraction grating projects light either through or on the light modulating medium. When there are no diffraction grating lines in the light modulating medium the light that is either transmitted through or reflected from the light modulating medium is masked by a light mask. However, when there is a diffraction grating it diffracts the light, deviating it, so that some of the light is incident on transparent areas in the light mask, the amount of light so incident being dependent upon the depths of the diffraction grating lines. Since these depths are a function of the amplitude of the applied television signals, the light transmitted by the light mask is a function of these signals. Consequently, when this transmitted light is focused on a projection screen it produces a viewable image of the televised scene.

The brightness of the projected picture depends upon the number and intensity of the light sources that are utilized, and thus a plurality of light sources are usually desired. Since these light sources have to be narrow in width, a very convenient way of obtaining them is by using a relatively large single brilliant light source, the light from which is cast on a light mask having narrow slits. The light transmitted by these narrow slits forms the desired light sources.

Unfortunately, with the above arrangement only a relatively small portion of the light from the light source is cast on the light modulating medium. The utilized light is that from the light source that is directly incident on the slits in the light mask and that light that is reflected by a reflector from the back side of the light source onto the slits. With the prior reflecting arrangements, only a small portion of the light from the light source is incident on the slits.

Accordingly, an object of the present invention is to provide an improved light source system in which the light is used efficiently.

A further object is to provide an improved reflecting arrangement.

In some applications it is desired to produce light images of characters such as letters of the alphabet and numbers. It has been difficult to project these characters with prior type projection systems since these systems diffract light in only one direction—orthogonal to the narrow dimension of the light source. And since these light sources have been linear, this means that the projected light can be diffracted only in one direction while many of the desired characters and numbers have lines extending in different directions, the light corresponding to which would have to be diffracted in many directions if a single grating line arrangement is used, and it is desirable to utilize a single grating line.

Thus, another object of the present invention is to provide an improved light system for a diffraction type projection system capable of projecting light in many directions.

These and other objects are achieved in a preferred embodiment of my invention in which light from a single light source is focused by an ellipsoidal mirror on a cylindrical mirror producing a curved concentration of light usable as a concentrated source. This light may be cast on the surface of a deformable light modulating medium. The diffraction gratings in the light modulating medium can diffract light in any direction and thus the projection of images of characters and numbers can be readily obtained.

Figures 2, 3:
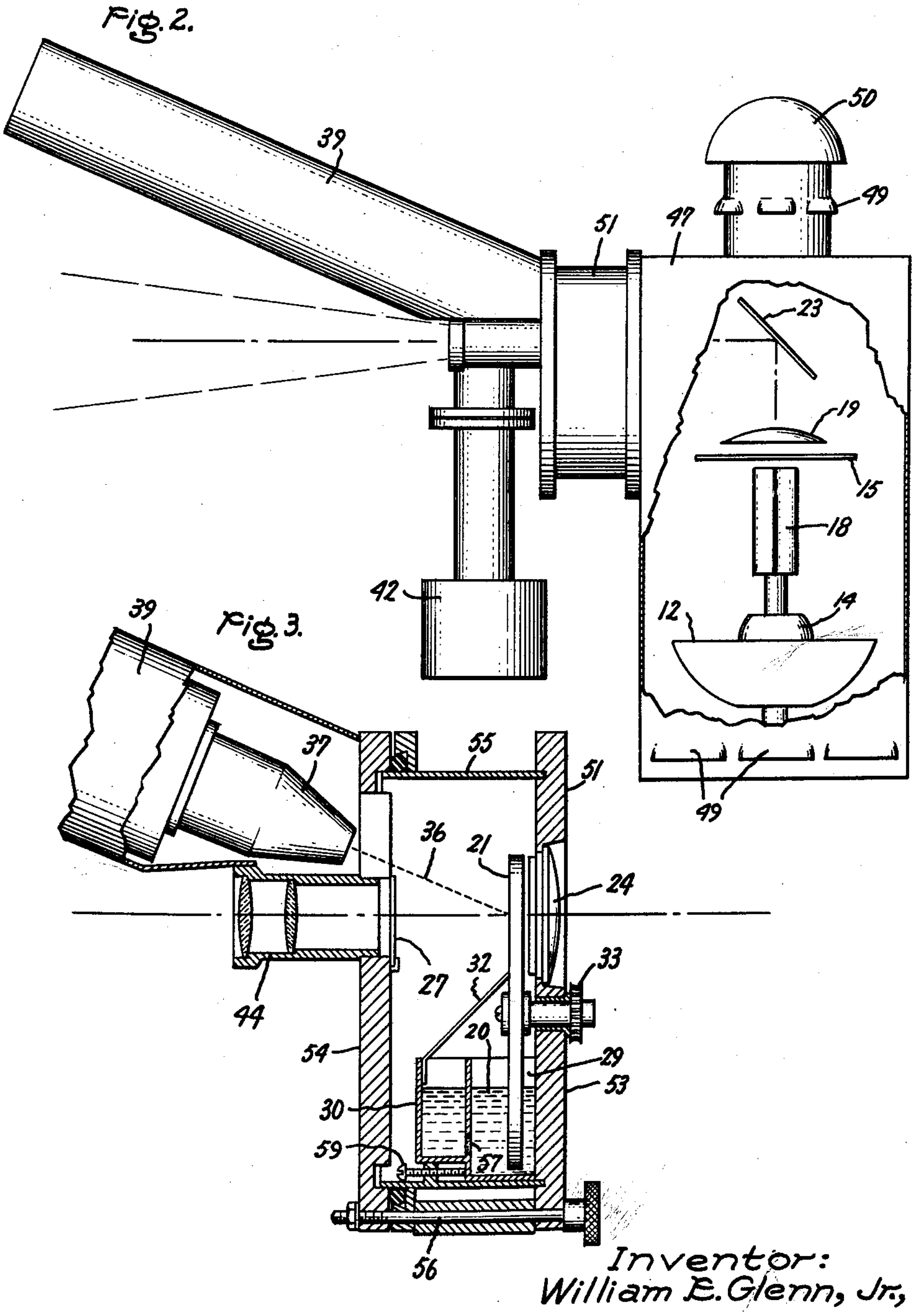
Figures 4, 5, 6:
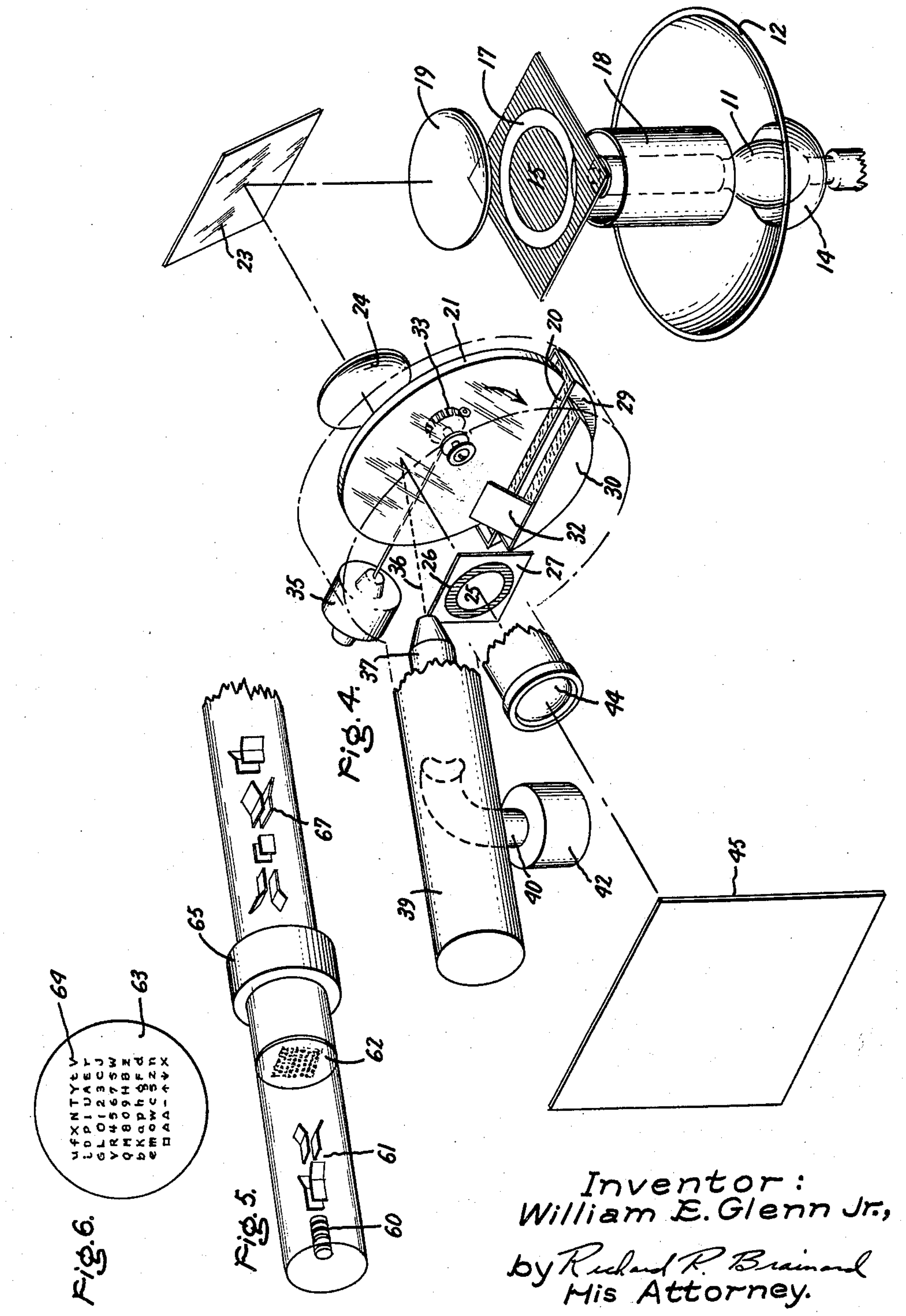

The novel features believed to be characteristic of the present invention are set forth with particularity in the appended claims. My invention, itself, however, together with further objects and advantages thereof may best be understood by reference to the following description taken in connection with the accompanying drawings in which:

FIG. 1 is a perspective illustration of a preferred embodiment of my invention,

FIG. 2 is a side elevational view, partially in section of the embodiment of FIG. 1, FIG. 3 is an enlarged view of a portion of the embodiment of FIG. 1, FIG. 4 is a perspective view of another embodiment of my invention, FIG. 5 is a perspective view of one type of electron gun that can be used with the embodiment of FIG. 4 for the formation of characters, and FIG. 6 is an enlarged view of a character matrix for the electron gun of FIG. 5.

In the embodiment of FIG. 1, a source 11 of white light, preferably a xenon-arc lamp, is positioned at one of the focal points of and on the plane of the outer edge of an ellipsoidal mirror 12, which has an opening 13 for the insertion of one of the connectors to the light source 11. Source 11 is also positioned at the center of a spherical mirror 14 which directs light incident thereon back onto the light source 11 so that a maximum amount of light is directed to mirror 12. At the other focal point of mirror 12, there is a first light mask 15 which has an aperture 17 in the form of two "half moons" that diminish in width to zero at the points of contact of the two half moons.

A cylindrical mirror 18 is provided for causing the light from mirror 12 to have the shape of aperture 17 when this light is at the position of mask 15. Due to this shape, most of the light is incident on aperture 17 and very little of it is masked. Mask 15 only gives a sharp edge to this light.

The cylindrical mirror 18 has a cross section in the form of two arcs of two equal diameter circles, each of which extends approximately 160°, and which meet at two points that are adjacent the two points of zero thickness of aperture 17. It can be shown that the center of each arc of cylinder 18 should be half way between the center of light mask 15 and the center of the outermost portion of aperture 17. Mirror 18 extends from approximately the position of mirror 14 to close to mask 15 such that it intercepts all of the light from mirror 12 directed towards the center of mask 15. The light transmitted by the two halves of aperture 17 produces, in effect, two light sources.

With this type of light source arrangement substantially all of the light produced by source 11 passes through aperture 17. Substantially the only light lost is that passing through aperture 13 in mirror 12 and through the aperture in mirror 14. The lead (not shown) that has to be brought over to the upper pole of source 11 creates only a very small shadow. Almost all of the remainder light, which is by far the most of the light produced by source 11, is incident on aperture 17.

The high light efficiency is obtained by substantially surrounding the light source 11 with reflecting surfaces. However, a hole in mirror 12—aperture 13—is required to do this. With this aperture in the middle of mirror 12, the light from light source 11, when imaged, would have a dark spot at its center, were it not for mirror 18. But mirror 18 causes the image of the light source 11 to be substantially uniformly illuminated. This can be shown by drawing lines representing the paths of the light rays. In other words, the light passing through aperture 17 appears to originate from a round, uniformly illuminated light source.

The light transmitted by aperture 17 is focused by a lens 19 on a light modulating medium 20, a film of which is formed on a rotating, transparent disk 21. The object distance for this light is from lens 19 to the upper edge of mirror 12. The image distance is from lens 19 to the backside of disk 21. After passing through lens 19 the light is reflected from an infrared transmitting dichroic mirror 23 which directs the visible light through another lens system 24. Lens system 24, in the absence of a diffraction grating in the light modulating medium 20, focuses the light on an opaque region 26 of a second light mask 25 that has transparent regions 27. Lens system 24, being very close to the light modulating medium 20, does not appreciably affect the focusing action of lens 19. The object distance for this light is from lens 24 to mask 15. The image distance is from lens 24 to light mask 25.

The light modulating medium is a transparent, deformable substance such as, for example, one of those described in my copending application, S.N. 708,528, filed January 13, 1958, and assigned to the assignee of the present invention. A pool of this medium is held within a container having a first section 29 and a second section 30 interconnected by a filter, not shown. As the disk 21 rotates in this medium, it is coated with a film onto which the diffraction gratings are formed. Since this film is subjected to an electron beam it tends to cross-link to some degree and thus a doctor blade 32 is provided for scraping off a portion of film into the container 30. A filter (not shown) between sections 29 and 30 then filters out any cross-linked material that may be present.

Disk 21 must have a transparent conducting coating on one side, which side is preferably the side on which the light exits from disk 21. The transparent conducting coating may be formed from many different materials, but it has been found that chrome or tin oxide is especially suitable.

Disk 21 is rotated through gears 33 by a motor 35 at a speed of the order of 1 to $\frac{1}{15}$ revolutions per minute. The speed of revolution is not critical but it should be great enough to prevent a significant amount of cross-linking of the material 21 at any one time. The electron beam may deflect several times over the same material without significantly cross-linking it. However, after a certain number of times the material will begin to cross-link significantly and thus the disk 21 should rotate this material out of the raster area of the electron beam before this condition has been reached. The speed of rotation should not be so great that the diffraction grating in moving causes a smear of the picture. At the slow revolutions indicated, this will not occur.

A diffraction grating is formed in the light modulating medium 20 by an electron beam 36 emanating from electron gun 37. Since the electron gun may be one disclosed in the prior art, its details are not presented.

The electron beam 36 must, of course, pass through a highly evacuated region. This high vacuum is provided by a vacuum enclosure 39, only partially illustrated, to which there is connected a gas exhaust tube 40 that is connected to a vacuum pump 42.

When there are diffraction gratings in the light modulating medium 20 they diffract the light so that some of it, the amount depending upon the parameters of the diffraction grating, is transmitted through the transparent areas 27 of the second light mask. The light so transmitted is focused by projection lens 44 on a projection screen 45. The object distance for this light is from lens 44 to disk 21. The image distance is from lens 44 to screen 45.

In FIG. 2 there is illustrated a side view of the system of FIG. 1. The light source is housed in an enclosure 47 having heat vents 49 at top and bottom. At the top there is a heat cap 50 for absorbing the infrared radiation passing through dichroic mirror 23. If desired, a blower arrangement may be provided for flowing cooling air through enclosure 47.

The light modulating medium 20 and the rotating disk 21 are positioned within an evacuated enclosure 51 to which is connected the envelope 39 for the electron gun.

The details of the enclosure 51 can be better seen in FIG. 3. Enclosure 51 comprises a front wall 53, a back wall 54 and an intermediate cylindrical wall 55 that are maintained in fixed relationship by one or more bolts 56. All of these parts are made separable because, eventually, the medium 20 may cross-link to such a degree that it has to be replaced. Then, the enclosure 51 must be opened for the replacement of this medium. A side view is illustrated of the filter 57 that filters out the cross-linked material. The container comprising sections 29 and 30 is held in place by a bolt 59.

In the operation of the embodiment of FIG. 1, the light from light source 11 is formed into essentially two light sources by the action of mirrors 12 and 18 and the light mask 15. One of these sources can be considered the light passing through the one half of aperture 17 and the other light source that light passing through the other half of aperture 17. These light sources have a narrow dimension and are generally longitudinally arranged, although they are curved. With the arrangement in FIG. 1, almost all of the light from light source 11 is utilized due to the mirror arrangement. The presence of the mirror 18 prevents the formation of a hole in the middle of the light source that would otherwise be produced by the presence of the aperture 13 in mirror 12. With the shown arrangement, the light passing through aperture 17 appears to come from a round, uniformly illuminated, light source.

The light passing through aperture 17 is incident upon the light modulating medium 20. If there are no diffraction gratings in light modulating medium 20, the light is completely masked by the opaque area 26 of the second light mask upon which the light is focused by lens 24. If there are diffraction gratings having grating lines extending in a direction orthogonal to the widths of aperture 17 and of the masking areas 26, they diffract light such that it is deviated from the opaque regions 26 and is transmitted through the transparent areas 27.

The amplitude of the light so transmitted is a function of the amplitude of the diffraction grating lines in the light modulating medium 20. This transmitted light is then focused by a projection lens 44 on a projection screen 45. If the diffraction grating corresponds to a televised scene, then the light transmitted by the second light mask and focused on the projection screen 45 produces a black and white image of the televised scene.

As regards the advantages of this system of FIG. 1, one of the most important advantages is that the image on screen 45 is, for the same size light source, much brighter than that obtainable with prior projection systems. Also, since the light transmitted by aperture 17 has the general shape of a circle there is no need for the use of an anastigmatic lens as with the prior projection system. That is, there is no appreciable astigmatism.

In FIG. 4, there is illustrated an embodiment of my invention in which the light can be diffracted in any direction through an angle of 360°. This apparatus is very similar to that shown in FIG. 1 except for the first and second light masks, the cylinder 18 and the reflector 14. Only these different elements will be discussed.

In FIG. 4 the aperture 17 in the first light mask is an annular opening. To provide an annular ring of light on this opening 17 a cylinder 19 having a circular cross section must be provided. Then the light from the ellipsoidal mirror 12 is in the form of an annular ring at the position of the first light mask which serves merely to provide a sharp edge to this light ring.

In FIG. 1 a spherical mirror 14 was placed above the light source. This arrangement can as well be used in the embodiment of FIG. 4. However, the illustrated arrangement is also suitable. In this arrangement the light source 11 is positioned near the bottom edge of the aperture 13 in mirror 12. The bottom edge is positioned such that, preferably, a line drawn from it to the source 11 makes an angle of approximately 20° with a plane that passes through source 11 and that is orthogonal to the axis of mirror 12. Mirror 12 is curved such that its focal point is at source 11. With this arrangement, the spherical mirror 14 is placed below mirror 12 for reflecting the light emanating from the lower half of the light source 11 back onto source 11. Thus, with this arrangement most of the light from light source 11 is utilized as it was in the light arrangement of FIG. 1 embodiment.

Since the aperture 17 is now an annular ring, the opaque region 26 in the second light mask 25 must likewise be an annular ring to mask the light when there are no diffraction gratings in medium 20. When there is a diffraction grating it diffracts some of the light through the transparent regions 27 of the second light mask.

Since there is annular symmetry to the optical arrangement in FIG. 4, light can be diffracted in any direction through an angle of 360°. This is especially desirable in those applications in which the diffraction gratings extend in more than one direction.

In FIG. 5 there is illustrated an electron gun for providing an electron charge pattern on the light modulating medium 20 corresponding to characters. This electron gun comprises a cathode and accelerating structure 60 for producing and accelerating an electron beam. This beam is directed by a deflection means 61 to the desired point on a character matrix 62, an enlarged view of which is illustrated in FIG. 6. The character matrix comprises an electron opaque piece of material 63 in which there are slits 64 in the form of the desired characters. When the electron beam is directed through one of these slits, it obtains the shape of these slits. Thus, if the deflection means 61 directs the electron beam, say to the character "A", then the electron beam in passing through the slit A obtains the shape of the letter A. After the electron beam has been directed to the desired character it is redirected to the axis of the electron gun by a deflection system 65 illustrated as an electromagnetic system. Then the electron beam is directed to the desired portion of the target area by a deflection system 67. If the target area is a phospor screen, the electron beam, since it is in the shape of a letter A, forms a letter A of light on the phosphor screen. By sequentially obtaining different characters and properly positioning them on the phosphor screen, a message can be written out.

In the illustrated apparatus a phosphor screen is not used but the function is the same. That is, the electron beam in the shape of the character strikes the deformable medium, thereby producing an electron charge pattern in the shape of this character. This pattern is then attracted to the conducting coating on the disk 21 and in so being attracted forms a depression in the shape of the letter that phase diffracts the incident light through the transparent areas 27 of the second light mask such that the light when focused on the projection screen has the shape of the character. Due to the annular optics the deformations in the light modulating medium can extend in any direction and yet the desired diffraction is obtained. It is also noted that the lines of the characters are formed by single lines that may extend at angles with respect to one another. In the prior projection systems each character line has to be formed from a plurality of parallel diffraction grating lines. Thus, in these prior systems, a simple character matrix, such as is illustrated in FIG. 6, cannot be used in such prior system.

This system has the advantage of being very efficient in the utilization of the light as has been mentioned with reference to the embodiment of FIG. 1.

While the invention has been described with respect to certain specific embodiments, it will be appreciated that many modifications and changes may be made by those skilled in the art without departing from the spirit of the invention. I intend, therefore, by the appended claims, to cover all such modifications and changes as fall within the true spirit and scope of the invention.

What I claim as new and desire to secure by Letters Patent of the United States is:

1. A light system comprising an ellipsoidal mirror having an annular shape and having an aperture in its center, said ellipsoidal mirror having an inner edge at the position of said aperture and an outer edge, said ellipsoidal mirror being curved such that said outer edge is in the plane of one focal point of said mirror nearer said inner edge, a light source positioned at said one focal point and having an input lead extending through said aperture, and a cylindrical mirror positioned coaxial with said ellipsoidal mirror and extending such that substantially all of the light from said ellipsoidal mirror directed towards the other focal point of said ellipsoidal mirror is intercepted by said cylindrical mirror to produce an arcuate image in the plane of the last mentioned focal point.

2. The light system as defined in claim 1 in combination with a spherical mirror positioned between said light source and said cylindrical mirror for reflecting substantially all of the light incident thereon back onto said light source.

3. A light system comprising an ellipsoidal mirror having an annular shape and having an aperture in its center, said ellipsoidal mirror having an inner edge at the position of said aperture, said ellipsoidal mirror being curved such that said inner edge is displaced of the order of 20° from the plane of one focal point of said mirror, a light source positioned at said one focal point and having an input lead extending through said aperture, and a cylindrical mirror positioned coaxial with said ellipsoidal mirror and extending such that substantially all of the light from said ellipsoidal mirror directed towards the other focal point of said ellipsoidal mirror is intercepted by said cylindrical mirror producing diverging light rays forming a focused arcuate image in the plane of said other focal point.

4. The light system as defined in claim 3 in combination with a spherical mirror positioned beneath said ellipsoidal mirror at the aperture thereof for reflecting substantially all of the light incident thereon back onto said light source.

5. A light system comprising an ellipsoidal mirror, a light source positioned at one focal point of said ellipsoidal mirror, and a cylindrical mirror positioned coaxial with said ellipsoidal mirror and extending along the ellipsoid major axis such that substantially all of the light from said ellipsoidal mirror directed towards the other focal point of said ellipsoidal mirror is intercepted by said cylindrical mirror to produce a distinct arcuate image in the plane of said other focal point formed of diverging light rays appearing to originate from a uniformly illuminated source.

6. The light system as defined in claim 5 and a spherical mirror positioned to reflect substantially all of the light from said light source directed away from said ellipsoidal mirror back onto said light source.

7. A light system comprising a light source, a mirror arrangement around said light source for imaging the light from said source including a first mirror means for bringing light from said source to a focus and a cylindrical second mirror, coaxial with said first mirror means, for intercepting and reflecting said light before it reaches said focus of said first mirror means for establishing in the plane of said focus a narrowly restricted elongated image, the light appearing to diverge from a uniformly illuminated source when viewed at said image being a large portion of the light originating from said source.

8. A light system comprising ellipsoidal mirror, a light source positioned at one focal point of said ellipsoidal mirror, and a cylindrical mirror positioned coaxial with said ellipsoidal mirror and extending along the ellipsoid major axis such that substantially all the light from said ellipsoidal mirror directed towards the other focal point of said ellipsoidal mirror is intercepted by said cylindrical mirror, said cylindrical mirror having a cross-section including plural arcs of plural circles, the light intercepted by said cylindrical mirror producing an arcuate image in the shape of half moons in the plane of said other focal point, formed of diverging light rays appearing to originate from a uniformly illuminated source.

References Cited in the file of this patent

UNITED STATES PATENTS

| | | |
|---|---|---|
| 1,256,522 | Croxton | Feb. 19, 1918 |
| 1,633,838 | Zimmerman | June 28, 1927 |
| 1,640,448 | Halvorson | Aug. 30, 1927 |